United States Patent

Bendicks et al.

Patent Number: 5,323,637
Date of Patent: Jun. 28, 1994

[54] MOISTURE SENSOR

[75] Inventors: Norbert Bendicks, Hemer; Berthold Esders, Schalksmuehle, both of Fed. Rep. of Germany

[73] Assignee: Leopold Kostal GmbH & Co. KG, Fed. Rep. of Germany

[21] Appl. No.: 925,938

[22] Filed: Aug. 5, 1992

[30] Foreign Application Priority Data

Dec. 20, 1991 [DE] Fed. Rep. of Germany ....... 4142146

[51] Int. Cl.$^5$ ............................................. G01N 21/17
[52] U.S. Cl. .................................. 73/29.01; 73/29.04; 73/29.05; 318/34; 318/119; 318/140; 318/483; 318/806; 318/DIG. 2
[58] Field of Search ................ 73/29.01, 29.07, 335.01, 73/335.07, 29.04, 29.05; 318/34, 119, 140, 806, 483, DIG. 2

[56] References Cited

U.S. PATENT DOCUMENTS

| | | | |
|---|---|---|---|
| 4,481,450 | 11/1984 | Watanabe et al. | 318/DIG. 2 |
| 4,589,771 | 5/1986 | Watanabe et al. | 318/DIG. 2 |
| 4,676,638 | 6/1987 | Yasuda | 318/DIG. 2 |
| 4,797,605 | 1/1989 | Palanisamy | 318/DIG. 2 |
| 4,805,070 | 2/1989 | Koontz et al. | 73/335.02 |
| 4,831,493 | 5/1989 | Wilson et al. | 73/335.02 |
| 4,859,867 | 8/1989 | Larson et al. | 318/DIG. 2 |
| 4,916,374 | 4/1990 | Schierbeek et al. | 318/DIG. 2 |
| 4,960,996 | 10/1990 | Hochstein | 318/DIG. 2 |
| 5,059,877 | 10/1991 | Teder | 318/DIG. 2 |

FOREIGN PATENT DOCUMENTS 3314770  10/1984  Fed. Rep. of Germany .

Primary Examiner—Timothy M. McMahon
Attorney, Agent, or Firm—Brooks & Kushman

[57] ABSTRACT

A moisture sensor which registers the amount of moisture from tear-shaped precipitation, particularly on a windshield. The device includes a beam director which is mounted on the windshield by an optical adhesive. The beam director has a beam transmitter on one side and a beam receptor on the other. To ensure an optically perfect attachment of the beam director as an integrated unit to the windshield, there is a parallel relationship between the windshield and the facing surface of the beam director. An optical adhesive is applied to the gap between the windshield and the beam director, and is confined to a particular area.

15 Claims, 2 Drawing Sheets

MOISTURE SENSOR

TECHNICAL FIELD

This invention relates to a moisture sensor which registers the degree of moisture from tear-shaped precipitation on a windshield. Such devices are particularly helpful for registering the amount and/or type of moisture which is present within a unit of time on the front or rear windshield of an automobile. Depending on the degree of moisture, the device sends a signal to a motor associated with the windshield wiper system by means of a control unit.

BACKGROUND ART

In DE 33 14 770 C2, a device for the operation of a motor-driven windshield wiper system was introduced. This system uses a beam director mounted directly on the inner surface of the windshield. The beam director is associated with a beam transmitter which emits rays through the windshield. If there is the least reflection at the exterior surface of the windshield because of moisture which is present, some portion of the rays are directed to an associated beam receptor.

The attachment of such beam directors to a windshield may be achieved by means of optical adhesives. However, this presents two problems: certifying perfect adhesion and guaranteeing perfect beam paths. Every variation in alignment of the beam directors and discontinuities in the beam paths potentially interferes with the device's reading, and therefore may affect the operation of the windshield wiper system.

Therefore, the needs have arisen for a moisture sensor device which guarantees that (1) the inner windshield surface and the beam director surfaces are parallel, and (2) the optical adhesive is applied uniformly between the windshield and the beam director.

SUMMARY OF THE INVENTION

To address these needs, there is disclosed a sensor device which registers the degree of moisture on a transparent windshield. A beam director with a rectangular windshield-facing base area is attached by means of an optical adhesive to the inner surface of the windshield, which is not subject to precipitation, in an area which is covered by the motor-driven wiper system. The beam director's surfaces are arranged in such a way that the beams emitted by a beam transmitter are reflected depending on the precipitation on the windshield, and directed to a beam receptor, which then sends a signal dependent on the degree of moisture. The signal is communicated to the motor-driven wiper system by means of a control unit.

Two dome-shaped elevations of equal height are present on the base area of the beam director, which faces the windshield. They are separated from each other but are symmetrical about the longitudinal axis of the base area of the beam director and are located near an edge. Toward the opposite edge, there is at least one dome-shaped elevation arranged in a symmetrical relation to and with a height and shape corresponding to the two dome-shaped elevations. In addition, bridge-type elevations are located in the margins which run parallel to at least two edges of the beam director, extending for almost the full length of the edges. The height of these elevations is slightly less than that of the dome-shaped elevations.

In the beam director, there is at least one aperture which extends from the back surface to the windshield-facing surface, and is located outside of the beam path in the middle area of the unit. The aperture allows an optical adhesive to be introduced between the beam director and the windshield.

In such a sensor, when the beam directors are attached to windshields in mass production, the results are consistently reproducible and certifiable; i.e., no individual adjustment of an electronic analyzer is necessary in order to deal with variable fixing results.

BEST MODE FOR CARRYING OUT THE INVENTION

Figure 1:
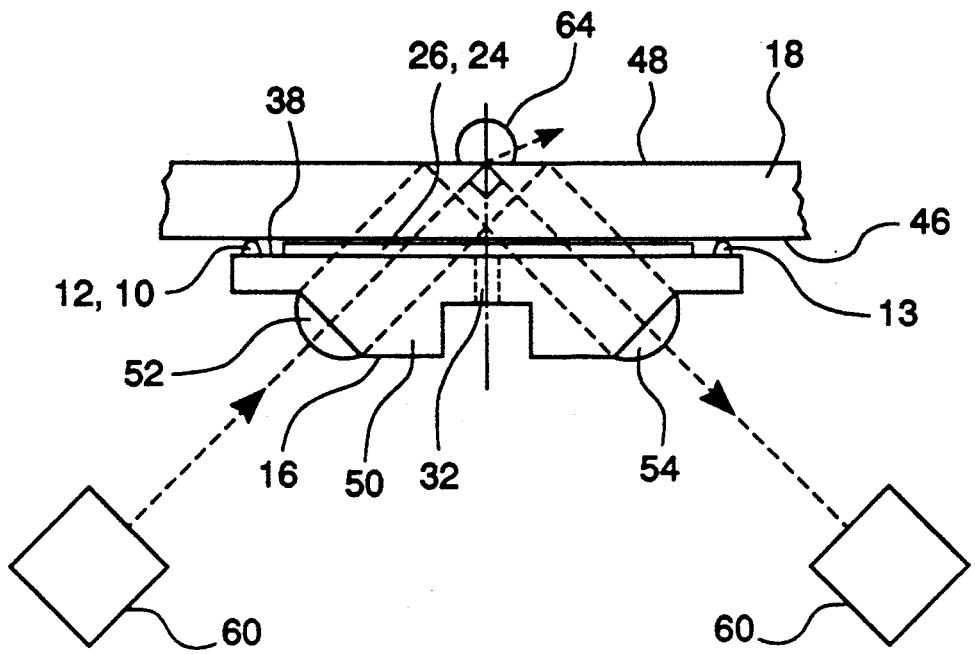
FIG. 1 shows a horizontally-oriented sectional view of an individual beam director in relation to a windshield.

FIG. 1 shows a sensor device which registers the degree of moisture from tear-shaped precipitation 64 on a windshield 18, preferably made of glass. This device includes a beam transmitter 60 on one side and a beam receptor 62 on the other side. A beam director 16 is mounted by means of an optical adhesive (not shown) on the inner surface 46 of the windshield 18, which is protected from precipitation. The sensor device is supported within a housing (not shown for simplicity). This housing is in a predetermined place (such as near the foot of a driving mirror pedestal) on the inner surface 46 which will not interfere with vision, but is located so that the sensor will still detect precipitation.

Figure 2:
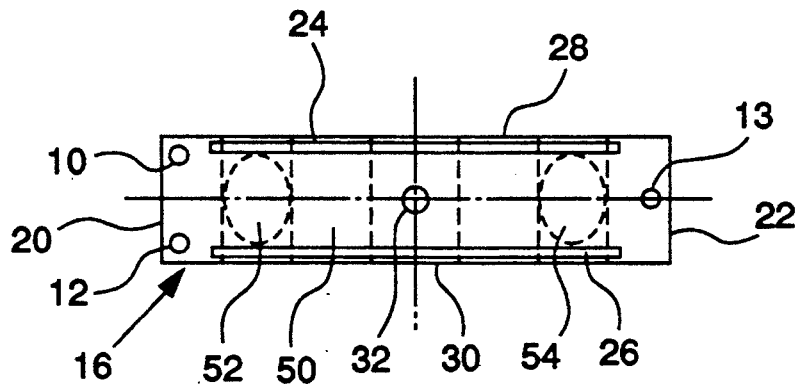
FIG. 2 shows a side elevational view of the beam director of FIG. 1.

The beam director 16 includes a body 50 (FIG. 2). On two opposing surfaces which are of equal size are beam lenses 52,54. The surfaces with which lenses 52,54 are associated are rectangular. The two equal surfaces are situated on the body 50 in such a way that the longitudinal axis of the two beam lenses 52,54 are perpendicular to each other (FIG. 1).

The beam lenses 52,54 can be attached by means of a centering pin and optical adhesive, or they can be formed directly on the body 50 as one piece.

In order to attach the beam director 16 on the windshield 18 in such a manner that the surface of the beam director 16 adjacent to the windshield 18 runs parallel to the inner surface 46 of windshield 18, there are in the area of the shorter margin or edge 20 (FIG. 2) two dome-shaped elevations of equal height (10,12) which are symmetrically disposed about the longitudinal axis of the windshield-facing surface of body 50 of the beam director 16. In the opposite margin or edge 22, there is another dome-shaped elevation 13 which is of equal height to elevations 10,12 and which is located on or near the longitudinal axis.

The three dome-shaped elevations 10, 12, and 13 act as a tripod, which enables a static, fixed positioning of the beam director 16, and ensures that the windshield-facing surface 38 of the beam director 16 is parallel to the windshield 18. The preferred size of the elevations 10,12,13 is in the range of 0.2 to 0.3 mm. This size range has been chosen so that a perfect adhesive layer between the windshield 18 and the beam director 16 can be achieved which can, if necessary, absorb mechanical stresses arising between them.

The optical adhesive influencing the sensor device is applied through the aperture 32 between the windshield 18 and the beam director 16 proximate the center thereof. The central position of the aperture 32 ensures that it does not have a negative effect on the beam paths. The adhesive is distributed only on the surface area prescribed for it.

To ensure that the adhesive is confined to the prescribed area, there are bridge-type elevations 24,26 which extend over the length of the device in the margins or edges 28,30. In conjunction with the viscosity of the adhesive, they prevent the adhesive from advancing beyond the longer edges of the beam director. The height of these two elevations 24,26 is slightly less (preferably about 0.1 mm less) than the height of the dome-shaped elevations 10, 12, 13. Because of this difference in height, the bridge-type elevations 24,26 do not interfere with the static position of the beam director 16 on the windshield 18.

The adhesive will also be directed by the bridge-type elevations 24,26 in the direction of the dome-shaped elevations 20,22. Precise measurement of the quantity of adhesive ensures that the adhesive will not advance significantly beyond the shorter edges of the beam director. This effect could also be achieved by the addition of further bridge-type elevations in the margins 20,22.

Figure 3:
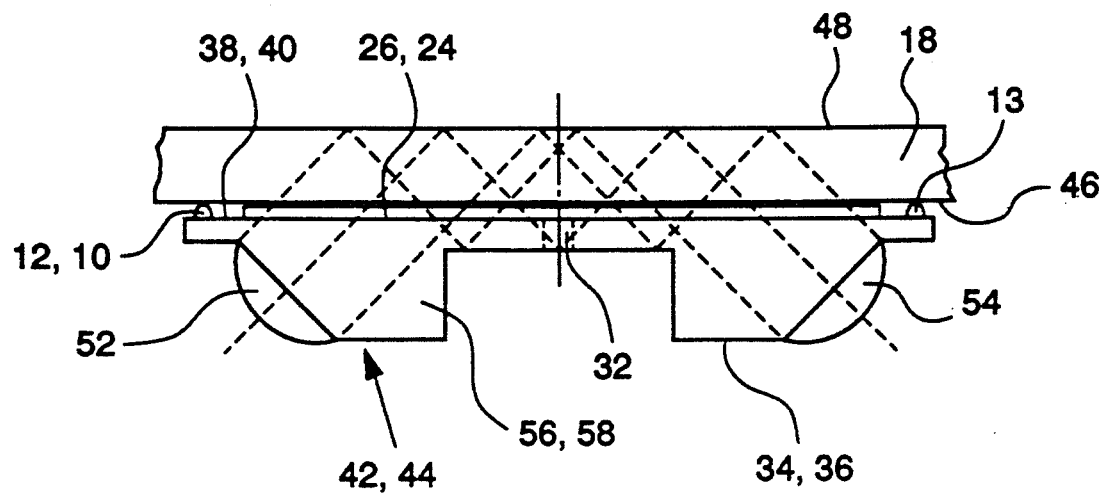
FIG. 3 shows a horizontally-oriented sectional view of two beam directors integrated as one unit in relation to the windshield.
Figure 4:
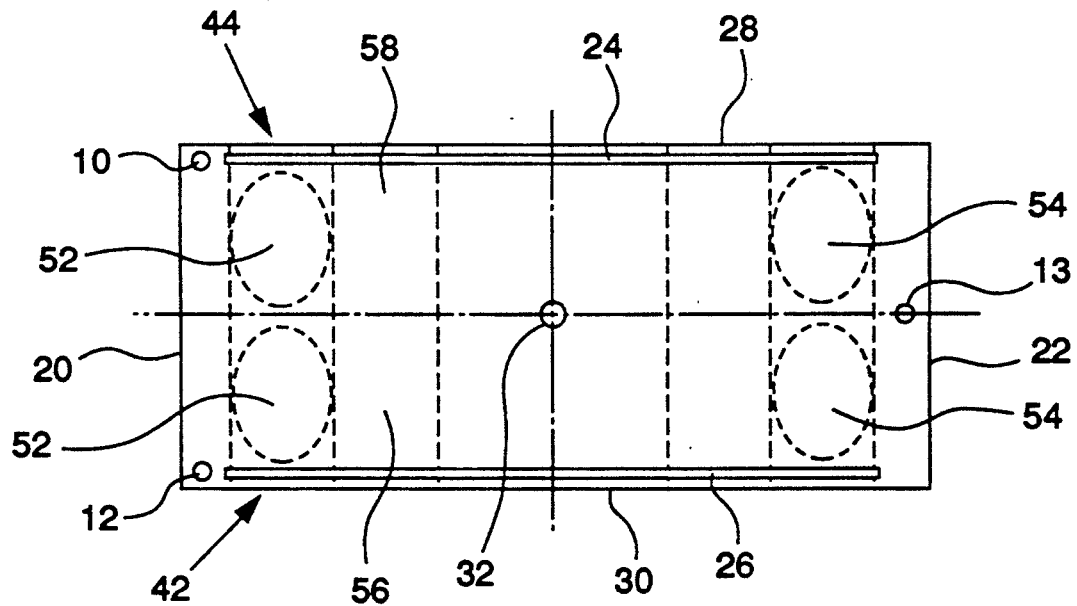
FIG. 4 shows a side elevational view of the integrated unit of FIG. 3.

FIGS. 3 and 4 show an alternate embodiment of the sensor device, which presents an enlarged windshield-facing surface area. In these figures, two beam directors 42 and 44 are integrated into one unit and the two bodies are manufactured in one piece. In order to prevent the beam paths in one beam director 42 from affecting the beam paths in the other beam director 44, there is an optical break (not shown). This is realized with the help of dividing walls and open areas in the integrated unit.

To assist in attaching the integrated unit to the windshield 18, there are, in the margin 20 of the total windshield-facing area resulting from the combination of the beam directors' surface areas 38,40 (FIG. 3), two symmetrical dome-shaped elevations of equal height 10,12 (FIG. 4). In the opposing margin 22, another dome-shaped elevation 13 is present. This is symmetrical to the other two elevations 10,12 and is identical in height to them.

In addition, there are bridge-type elevations, 24,26, which extend nearly the complete length of the device. These are slightly less in height than the dome-shaped elevations 10, 12, 13.

Further, in the center of the integrated unit is an aperture 32, through which the adhesive is applied. Since aperture 32 is between the two beam directors 42 and 444, the path of the beams emitted by the beam transmitters is not affected, even in the case of multiple beam reflection as shown in FIG. 3. The beams are reflected by the beam directors 42,44 in the central area of their undersides 34,36. To achieve a perfect reflection, the undersides in these areas are provided with a reflecting layer, preferably produced through thin film technology.

In order that neither the border of the adhesive, which in practice does not exhibit a uniform contour, nor the exact outline of the beam director can be recognized from the outside of the vehicle, the windshield 18 is provided with either a stamped or an etched structure on its inner surface 46 in the area defined by the margins 20, 22, 24, 30.

In addition, to prevent the internal structure of the sensor device from being seen from the outside, either the adhesive or the beam director or both may be colored darkly in such a way that they are penetrable by beams—such as infrared rays—emitted by the beam director while remaining invisible to the outside observer.

While the best mode for carrying out the invention has been described in detail, those familiar with the art to which this invention relates will recognize various alternative designs and embodiments for practicing the invention as defined by the following claims.

What is claimed is:

1. A sensor device for registering the degree of moisture on a transparent windshield, comprising:
   a beam director having a rectangular windshield-facing surface, the beam director being attached by an optical adhesive to the inner surface of the windshield;
   a beam transmitter in optical communication with the beam director, the beam director being configured in such a manner that the beams emitted by the beam transmitter, depending on the precipitation on the windshield, are reflected;
   a beam receptor also in optical communication with the beam director, the beam receptor receiving reflected beams passing through the beam director before communicating a signal to a control unit which controls a motor for driving the windshield wipers, the signal being dependent on the degree of moisture;
   the windshield-facing surface of the beam director being comprised of a rectangular area formed adjacent to the inner surface of the windshield;
   a first pair of elevations of equal height, separated from each other but symmetrical about the longitudinal axis of the rectangular windshield-facing surface of the beam director and being located proximate an edge of the rectangular area;
   at least one additional elevation located at the opposite edge of the beam director, the at least one additional elevation being symmetrical with the first pair of elevations and of corresponding height such that the windshield-facing surface of the beam director is parallel to the windshield;
   a pair of elevated guideways located proximate the edges of at least two sides of the windshield-facing surface of the beam director, the elevated guideways running parallel to and extending nearly the full length of these edges and having a height which is slightly less than the other three elevations so as to retain the optical adhesive within the rectangular area; and
   at least one aperture in the beam director through which the optical adhesive is applied, the aperture extending from a back surface of the beam director to the windshield-facing surface thereof, and being situated outside the beam path proximate a central area of the sensor device.

2. A sensor device for registering the degree of moisture on a transparent windshield, comprising:
   a plurality of beam directors integrated into one unit but optically separated from each other, the integrated unit having a rectangular windshield-facing surface and being attached by an optical adhesive to the inner surface of the windshield;

one or more beam transmitters in optical communication with the beam directors, the beam directors being configured in such a manner that the beams emitted by the beam transmitters, depending on the precipitation on the windshield, are reflected;

one or more beam receptors also in optical communication with the beam directors, the beam receptors receiving reflected beams passing through the beam directors before communicating a signal to a control unit which influence a motor for driving the windshield wipers, the signal being dependent on the degree of moisture;

the windshield-facing surface of the integrated beam director being comprised of a rectangular area formed adjacent to the inner surface of the windshield;

a first pair of elevations of equal height, separated from each other but symmetrical about the longitudinal axis of the rectangular windshield-facing surface of the beam directors and being located proximate an edge of the rectangular area;

at least one additional elevation located at the opposite edge of the beam director, the at least one additional elevation being symmetrical with the other two elevations and of corresponding height such that the windshield-facing surface of the beam director is parallel to the windshield;

a pair of elevated guideways located proximate the edges of at least two sides of the windshield-facing surface of the beam director, the elevated guideways running parallel to and extending nearly the full length of these edges and having a height which is slightly less than the other three elevations so as to retain the optical adhesive within the rectangular area; and at least one aperture in the beam director through which the optical adhesive is applied, the aperture extending from a back surface of the beam director to the windshield-facing surface thereof, and being situated outside the beam path proximate a central area of the sensor device.

3. The sensor device of claim 1, wherein the first pair and the at least one additional elevations are of such a height that an equal distribution of the optical adhesive is ensured through the aperture between the windshield-facing surface of the beam director and the inner surface of the windshield.

4. The sensor device of claim 2, wherein the first pair and the at least one additional elevations are of such a height that an equal distribution of the optical adhesive is ensured through the aperture between the windshield-facing surface of the beam director and the inner surface of the windshield.

5. The sensor device according to claim 1, wherein the first pair and the at least one additional elevations have heights in the range of 0.2 to 0.3 mm.

6. The sensor device according to claim 2, wherein the first pair and the at least one additional elevations have heights in the range 0.2 to 0.3 mm.

7. The sensor device according to claim 1, wherein the elevated guideways have heights approximately 0.1 mm less than the height of the other elevations.

8. The sensor device according to claim 2, wherein the elevated guideways have heights approximately 0.1 mm less than the height of the other elevations.

9. The sensor device of claim 1, wherein an adhesive layer is provided in the area defined by the margins of the beam director;

the adhesive being colored darkly in a manner which allows emitted beams to pass, but which does not allow visible light to penetrate.

10. The sensor device of claim 2, wherein an adhesive layer is provided in the area defined by the margins of the integrated beam director;

the adhesive being colored darkly in a manner which allows emitted beams to pass, but which does not allow visible light to penetrate.

11. The sensor device of claim 1, wherein an adhesive layer is provided in the area defined by the margins of the beam director;

the windshield being provided with a structure in the area comprised of the margins of the beam director which conceals the elevations and the guideways;

the adhesive being colored darkly in a manner which allows emitted beams to pass, but which does not allow visible light to penetrate.

12. The sensor device of claim 2, wherein an adhesive layer is provided in the area defined by the margins of the integrated beam director;

the windshield being provided with a structure in the area comprised of the margins of the integrated beam director which conceals the elevations and the guideways;

the adhesive being colored darkly in a manner which allows emitted beams to pass, but which does not allow visible light to penetrate.

13. The sensor device of claim 1, wherein the windshield is provided with a structure in the area comprised of the margins of the beam director which conceals the elevations and the guideways;

the beam director being colored darkly in a manner which allows emitted beams to pass, but which does not allow visible light to penetrate.

14. The sensor device of claim 1 wherein the beam director is colored darkly in a manner which allows emitted beams to pass, but which does not allow visible light to penetrate.

15. The sensor device of claim 2 wherein the beam director is colored darkly in a manner which allows emitted beams to pass, but which does not allow visible light to penetrate.

* * * * *